United States Patent [19]
Auffret et al.

[11] Patent Number: 5,343,315
[45] Date of Patent: Aug. 30, 1994

[54] INTERACTIVE OPTICAL TRANSMISSION SYSTEM

[75] Inventors: René Auffret, Perros Guirec; Mouhammad Chawki, Lannion; Louis Berthou, Rospez, all of France

[73] Assignee: France Telecom, Establissement Autonome De Droit Public, France

[21] Appl. No.: 44,244

[22] Filed: Apr. 7, 1993

[30] Foreign Application Priority Data

Apr. 21, 1992 [FR] France ................... 92 04848

[51] Int. Cl.⁵ ................... H04B 10/00; H01S 3/08
[52] U.S. Cl. ................... 359/152; 359/173; 359/154; 372/96; 372/38
[58] Field of Search ............ 359/152, 154, 156, 161, 359/173, 181–182, 187–188, 195; 372/38, 96

[56] References Cited

U.S. PATENT DOCUMENTS

| | | | |
|---|---|---|---|
| 4,905,253 | 2/1990 | Chraplyvy et al. | 359/173 |
| 4,908,833 | 3/1990 | Chraplyvy et al. | 359/173 |
| 4,972,514 | 11/1990 | Linke | 319/182 |
| 5,020,153 | 5/1991 | Choa et al. | 372/96 |

FOREIGN PATENT DOCUMENTS

| | | | |
|---|---|---|---|
| 2662883 | 12/1991 | France . | |
| 0062638 | 3/1991 | Japan | 359/182 |

OTHER PUBLICATIONS

Electronics Letters, vol. 28. No. 2, Jan. 16, 1992–M³–Net: Demonstration Of HD WDM Optical Network Using Two–Electrode DFB–LD Filter As Tunable Narrowband FM Receiver–M. J. Chawki et al.
Electronics Letters, vol. 25, No. 9, Apr. 27, 1989–16–Channel Optical FDM Distribution/Transmission Experiment Utilising Multichannel Frequency Stabiliser And Waveguide Frequency Selection Switch.
Patent Abstracts of Japan, vol. 11, No. 245, E–531–2692 "Two–Way Optical Transmission System For Picture And Data" Mar. 16, 1987.
French Search Report–FR 9204848–FA 474784–Jan. 5, 1993.

Primary Examiner—Richard E. Chilcot, Jr.
Assistant Examiner—Kinfe-Michael Negash
Attorney, Agent, or Firm—Pearne, Gordon, McCoy & Granger

[57] ABSTRACT

An interactive optical transmission system including a transmitter assembly (EE) with a FSK DFB laser (10) and a receiver assembly (ER) having the same type of DFB laser (20) and functioning as a photoreceiver. In order to make this system interactive, the receiver (ER) is provided with a channel selection circuit (40) able to supply a current which will place the laser (20) of the receiver assembly (ER) well above the threshold and make it function as an amplitude shift keyed transmitter. The beam transmitted by said laser (20) will raise the optical transmission line (FO) to the transmitter assembly (EE). An amplitude demodulation (48) will make it possible to restore the selection code and control the appropriate information channel (S).

20 Claims, 3 Drawing Sheets

INTERACTIVE OPTICAL TRANSMISSION SYSTEM

BACKGROUND OF THE INVENTION

The present invention relates to an interactive optical transmission system. It is used in optical telecommunications and in particular in the transmission of video programs (normal or high definition television) and/or audio programs (music, information, etc.).

PRIOR ART

Distributed feedback or DFB semiconductor lasers have the interest of being able to form both transmitters and receivers. Therefore optical links can be produced with the same type of components, both on transmission and on reception.

The article by M. J. Chawki et al entitled "M³-NET: Demonstration of HD WDM Optical Network using Two-Electrode DFB-LD Filter as Tunable Narrowband FM Receiver", published in the journal "Electronics Letters", Jan. 16th, 1992, Vol. 28, No. 2 thus describes an optical network making it possible to transmit several programs with the aid of these components. Such a system is illustrated in FIG. 1.

As shown, this system comprises three transmitter assemblies EE1, EE2, EE3 and one receiver assembly ER between which there is an optical coupler CO of the 3 to 1 type, which receives the three beams from the transmitter assemblies, an optical transmission line FO, e.g. an optical fiber and a polarization control device CP. Each transmitter assembly essentially comprises a DFB semiconductor laser 10. This laser diagrammatically comprises a first confinement layer 12, an active layer 14, a second confinement layer 16 and a defractive grating 18. It transmits an optical beam, whose wavelength depends on the semiconductor materials used and the polarizing currents I1 and I2. Thus, it is possible to have three different wavelengths $\lambda 1$, $\lambda 2$, $\lambda 3$ for the three subassemblies EE1, EE2 and EE3. The three transmitted beams are designated $19_1$, $19_2$ and $19_3$. These lasers are also of the multielectrode type with a first and a second supply electrodes respectively E1 and E2. Each transmitter assembly comprises a double current source I1, I2 able to adjust the transmission wavelength of each transmitter and a current source, respectively S1, S2, S3 able to supply a current which is digitally encoded by the informations to be transmitted. This source is connected to the first electrode E1 of the laser and frequency shift keys the same.

The receiver assembly ER comprises a second laser 20, identical to the first laser 10, i.e. of the distributed feedback type, with a first confinement layer 22, an active layer 24, a second confinement layer 26 and a network 28. Like the first laser, the second comprises a first and a second electrodes, respectively E1 and E2.

The receiver assembly also comprises a wavelength selector 30 controlled by a computer 32 in order to regulate, by the bias of the currents I1 and I2 injected into the laser, the detection wavelength $\lambda 1$, $\lambda 2$ or $\lambda 3$.

The electrode E2 of the laser 20 supplies a voltage V, whose variations represent the information used in the transmitter laser 10 for the frequency shift keying of the transmitted optical beam.

A terminal selector 34 makes it possible to address the demodulated signal towards one or other of the three terminals 35, 36, or 37, as a function of the nature of the information received (normal or high definition television, sound, etc.).

Although satisfactory in certain respects, this system, like all systems having a transmitter and a receiver, suffers from the disadvantage of being unidirectional. The present invention aims at obviating this disadvantage by providing means to make the system interactive, i.e. authorize a control of the transmitter assembly from the receiver assembly.

SUMMARY OF THE INVENTION

To this end, the invention, which uses the advantage offered by DFB lasers of operating both as a transmitter and as a receiver provides, in the receiver assembly, means for supplying the laser above the threshold, so that at the desired moment it is brought into transmitter operating conditions, so that it supplies an optical beam which will serve as a support for a remote control of the transmitter assembly. In order to be able to discriminate the remote control information from the main information, the invention provides for the use of amplitude shift keying (ASK) for ensuring the interactivity, while maintaining frequency modulation or FSK for transmitting video and/or audio informations. The transmitter assembly having to receive the remote control signal comprises a special photodetector adapted to amplitude shift keying. The signal supplied by this photodetector can then control the information source of the transmitter, which makes it possible to select one or other channel.

More specifically, the present invention relates to an optical transmission system incorporating:

A) at least one transmitter assembly having a first distributed feedback (DFB) semiconductor laser, which has a first and a second supply electrodes, two current sources able to supply polarizing currents I1 and I2 and a source able to supply a current Si digitally encoded by informations, said source being connected to the first electrode and frequency shift keying (FSK) the optical beam transmitted by the laser, B) an optical transmission line able to receive said optical beam and transmit it, c) at least one receiver assembly incorporating a second laser, identical to the first, i.e. of the distributed feedback type, with a first and a second electrodes, said second laser operating as a receiver and supplying on its second electrode a voltage, whose variations represent the information used in the source of the transmitter assembly for the frequency modulation of the transmitted beam, and a terminal restoring said information, said system being characterized in that it also comprises means for the remote control of the source of the transmitter assembly from the receiver assembly, i.e. in order to make the system interactive, said means incorporating:

D) in the receiver assembly:
- a polarizing circuit able to tune the wavelength of the reception filter laser to that of the transmitter,
- a channel selection circuit connected to the first electrode of the second laser and able to supply the latter with current at above a current threshold for making it operate as a transmitter in amplitude shift keying, said circuit supplying an amplitude-encoded current, the second laser of the receiver assembly thus transmitting an amplitude-shift keyed optical beam, which is transmitted to the transmitter assembly across the optical transmission line, E) in the transmitter assembly:
a photoreceiver sensitive to the amplitude shift keying and receiving the amplitude-shift keyed optical beam from the second laser, said photoreceiver supplying a voltage restoring the code used for the amplitude shift keying of the second laser, a selection circuit controlled by the detection voltage and controlling the source, which comprises several information channels, the selection circuit selecting one of these channels as a function of the code received.

Thus, the laser of the receiver assembly functions sometimes as a receiver of frequency-modulated (FSK) signals (during the transmission of an information channel) and sometimes as an amplitude modulation transmitter (for a channel change remote control).

The present invention can apply to systems having a single transmitter assembly, but also to systems having several transmitter assemblies and a single receiver assembly, like the M³NET system (registered trademark) illustrated in FIG. 1. It can apply to systems having several receivers in the case where several subscribers have access to the same information source (which may contain one or more transmission assemblies).

The system according to the invention is in certain respects similar to bidirectional systems as described in French patent application FR-A-2,662,883, where there are two identical DFB laser assemblies operating in alternating manner, i.e. alternately in transmission and reception. However, the following important differences exist. In the present invention, the laser of the transmitter assembly always operates as a transmitter and not alternately as a transmitter and a receiver. Although the laser of the receiver assembly does operate alternately as a receiver and a transmitter, these two operating modes are very different, because when functioning as a receiver the laser demodulates a frequency shift keyed optical signal, whereas when functioning as a transmitter it functions in amplitude shift keying (ASK). The transmitter assembly of the present invention comprises means for demodulating an amplitude shift keyed optical signal, which is not the case in a bidirectional system. Finally, in the present invention, the transmitter assembly is controlled by the signal which it has received and demodulated, which establishes the interactivity, whereas in the prior art bidirectional system, said interactivity is absent due to the alternating operation, the two transmission channels being independent of one another.

DETAILED DESCRIPTION OF THE PREFERRED EMBODIMENT

Figure 1:
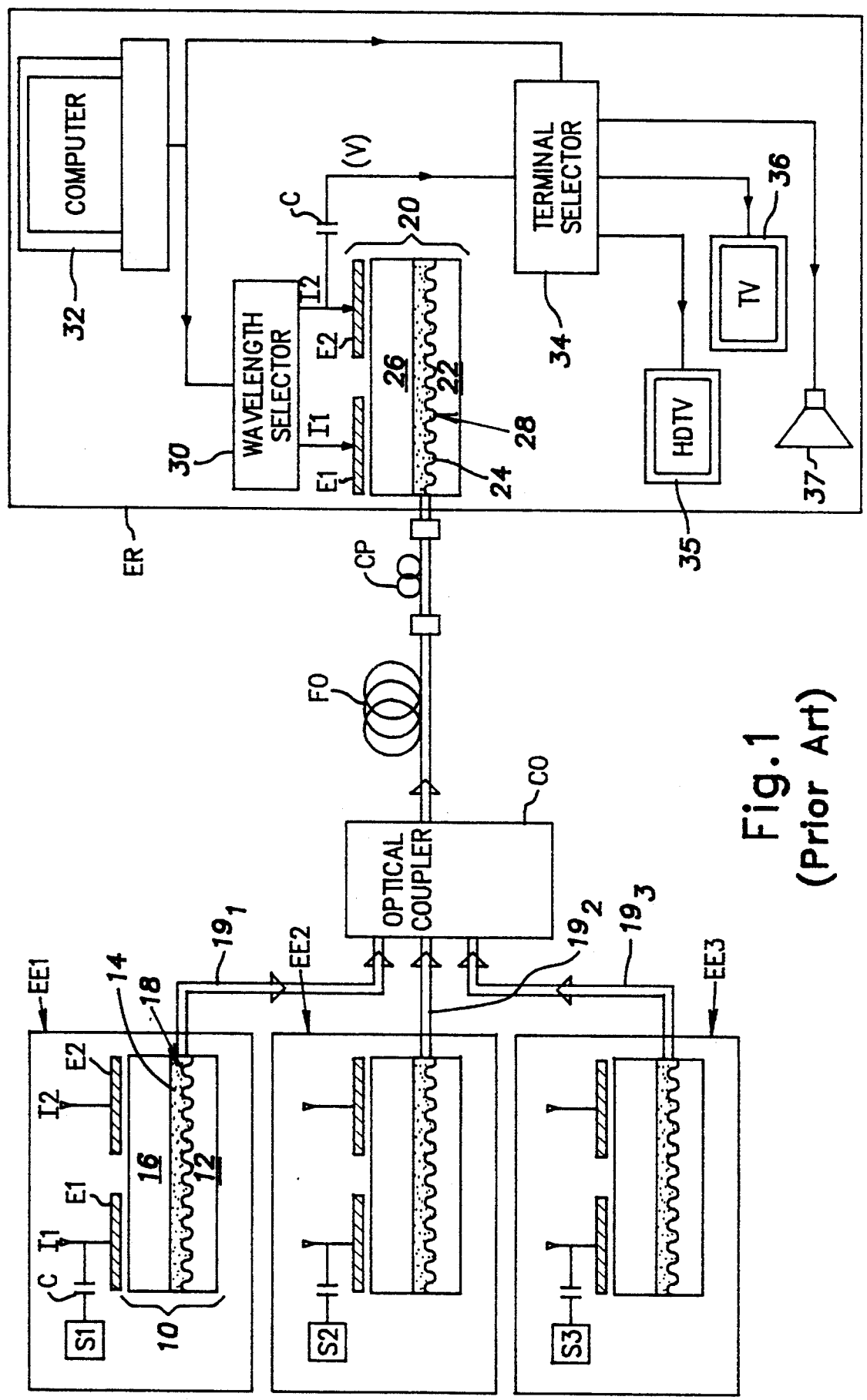
FIG. 1, already described, shows a known optical transmission system using DFB lasers.
Figure 2:
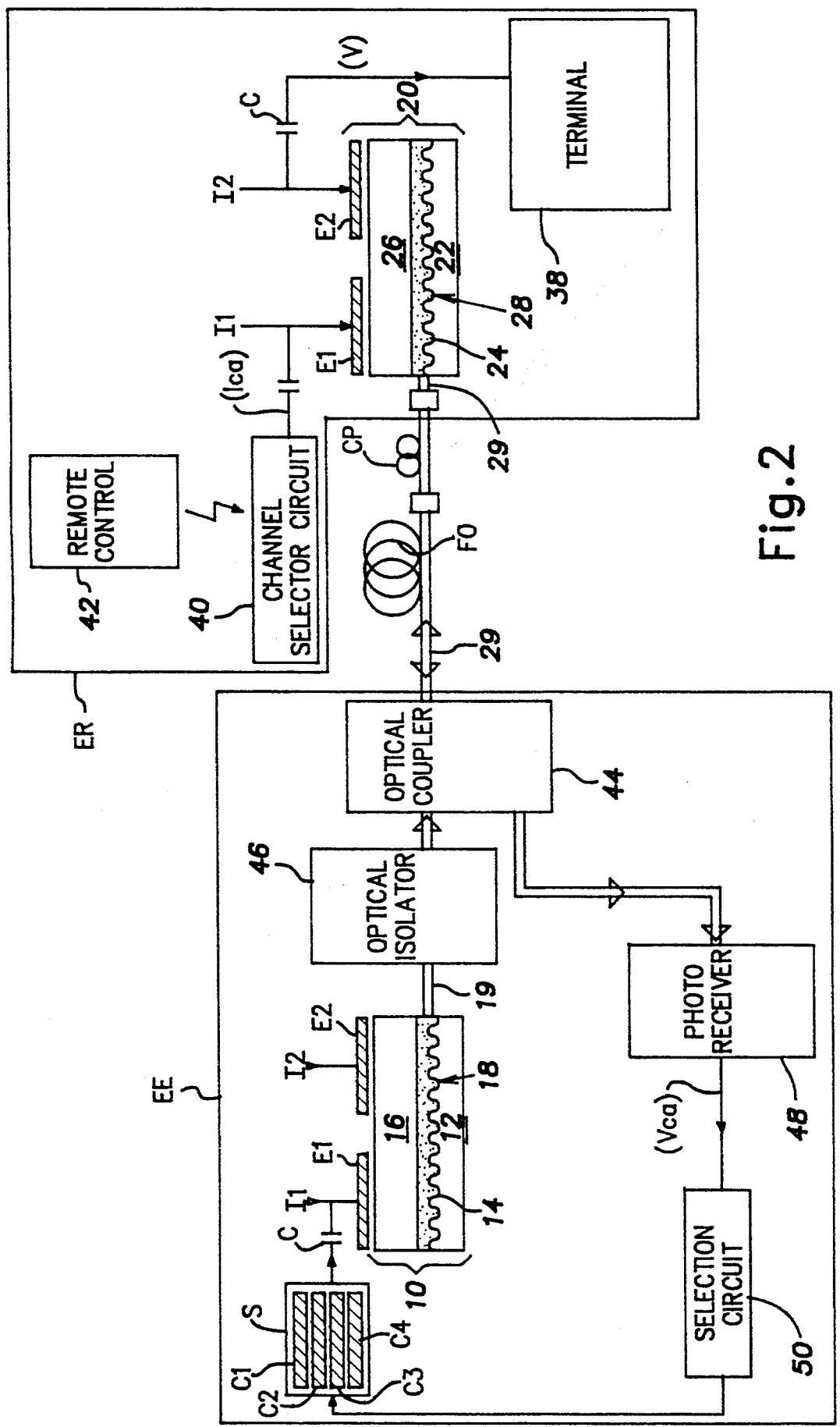
FIG. 2 diagrammatically shows a system according to the invention.

FIG. 2 shows an optical transmission system according to the invention in a variant having a single transmitter assembly. This system incorporates the means already encountered in FIG. 1 and which carry the same references for simplification purposes. They consist of the transmitter assembly EE with its DFB laser 10 (stack 12,14,16 and network 18), its two electrodes E1, E2 and its current sources I1, I2 for polarizing and regulating the transmission wavelength and the source Si for the frequency shift keying of the laser. There is once again a receiver assembly ER with its DFB laser 20 (stack 22,24,26 and the network 28), two electrodes E1, E2 and terminal 38. Between these two assemblies there is once again an optical fiber FO and a polarization controller CP. The latter means makes it possible to optimize the sensitivity of detection by adjusting the polarization direction of the incident light. This component is useful, but not indispensable.

The system shown in FIG. 2 also comprises means for the remote control of the source S of the transmitter assembly EE from the receiver assembly ER, i.e. in order to give the assembly an interactive character. These supplementary means firstly comprise, in the receiver assembly ER, a channel selection circuit 40 controllable manually or by means of a remote control box 42. This circuit 40 is connected to the first electrode E1 of the laser 20 and supplies the laser with current Ica at above the threshold in order to make the laser operate as an amplitude shift keyed transmitter. The laser 20 transmits an amplitude shift keyed optical beam 29, which is transmitted to the transmitter assembly EE across the optical transmission line FO.

In the transmitter assembly EE, in addition to the means already described in connection with FIG. 1, there is an optical coupler 44 for receiving the amplitude shift keyed optical beam 29 and for separating said beam from the beam 19 transmitted by the laser 10 and which has been frequency shift keyed. It can be a semitransparent strip or, functionally, a directional coupler. This coupler can be associated with an optical isolator 46 to ensure that the beam 29 does not disturb the operation of the laser 10.

The transmitter assembly once again contains a photoreceiver 48 sensitive to the amplitude shift keying. This photoreceiver receives the amplitude shift keyed optical beam 29 supplied by the coupler 44 and supplies a voltage Vca restoring the code used for amplitude shift keying in the second laser 20. This photoreceiver can be constituted by a PIN diode or an avalanche photodiode (APD).

Finally, the transmitter assembly also comprises a selection circuit 50 controlled by the detection voltage Vca and controlling the source S. Preferably, said source comprises several information channels C1, C2, C3, C4 and the selection circuit 50 selects one of these channels as a function of the code received.

In such a system, the transmitter assembly EE constitutes a program distribution center, whereas the receiver assembly is held by a subscriber. The latter consequently has the possibility by means of his remote control box to choose a channel (television, sound, etc.). The difference compared with a remote control in a broadcast or cable system of known type is that between the location of the remote control and the source, there can be in the case of the invention a very considerable distance, such as kilometers and only the selected program is transmitted.

Figure 3:
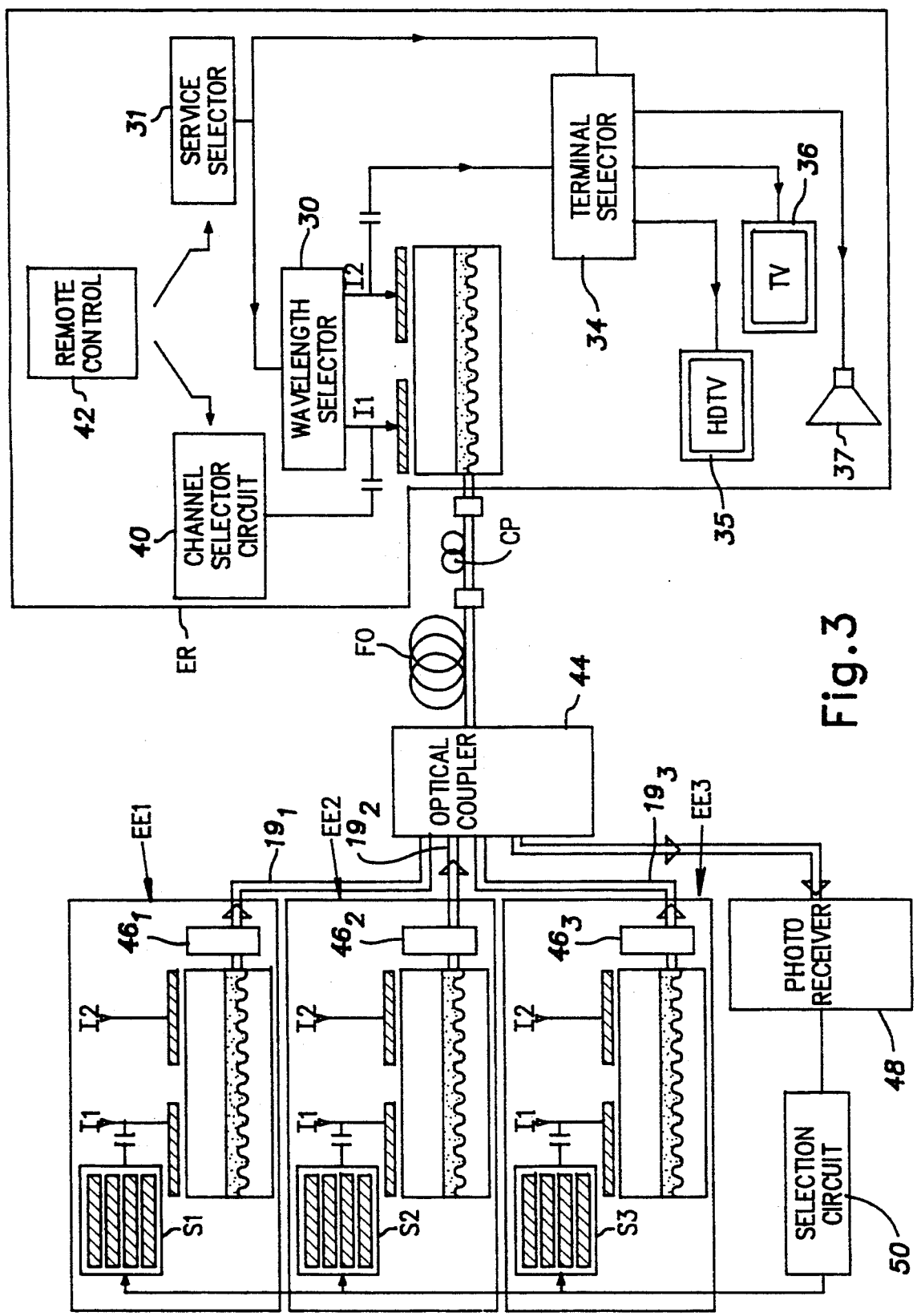
FIG. 3 illustrates a variant of the present invention having several transmitter assemblies.

The invention applies to more complex systems, e.g. a M³-NET (registered trademark) system illustrated in FIG. 1. The system obtained is illustrated in FIG. 3. It comprises three transmitter assemblies EE1, EE2, EE3 respectively, allocated to three different services, e.g.

high definition television, normal definition television and digital sound (laser disk). These three assemblies comprise three sources S1,S2,S3 supplying three lasers transmitting three beams $19_1$, $19_2$, $19_3$ at three different wavelengths $\lambda 1$, $\lambda 2$, $\lambda 3$. Each of these three assemblies has an optical isolator respectively $46_1$, $46_2$, $46_3$. A single type 3 to 1 coupler 44 is used for combining the three beams $19_1$, $19_2$, $19_3$. Moreover, said coupler supplies the remote control beam from the receiver and directs it to a single photoreceiver 48, which controls a channel selector 50, which in turn controls the sources S1, S2, S3.

On the receiver side, there is a service selector 31, the channel selector 40, the terminal selector 34 and the three terminals 35, 36, 37 respectively allocated in the considered example to high definition television, normal television and sound.

The system according to the invention can apply to several subscribers. In this case, an appropriate coding of the remote control signals transmitted by the different subscribers makes it possible to use a single detector in the transmitter assembly. In order to avoid collisions or conflicts, when two subscribers dial at the same instant, by means of the digital signal transmitted from the transmitter to the various subscribers, is supplied a specific information, which allows or prevents subscribers from dialing. Whenever a subscriber chooses a channel, an inhibiting information is transmitted to the other subscribers. In order to give the impression of transparency to the remote control, it is sufficient to place a buffer store in each channel selector. The control will then take place automatically as soon as authorization to dial is given. Since in practice remote control informations are very limited, the delay introduced for avoiding collisions will not be noticed by the user.

We claim:

1. Optical transmission system incorporating:
   A) at least one transmitter assembly (EE) having a first distributed feedback (DFB) semiconductor laser (10), which has a first (E1) and a second (E2) supply electrode, two current sources adapted to supply polarizing currents (I1,I2) and a source (S) adapted to supply a current $S_i$ digitally encoded by information, said source being connected to the first electrode and frequency shift keying (FSK) the optical beam transmitted by the laser;
   B) an optical transmission line (FO) for receiving and transmitting said optical beam (19);
   C) at least one receiver assembly (ER) incorporating a second laser (20), identical to the first laser (10) and having a first (E1) and a second (E2) electrode, said second laser (20) operating as a receiver and supplying the second electrode (E2) of said second laser (20) with a voltage (V), whose variations represent the information used in the source (S) of the transmitter assembly (EE) for the frequency modulation of the transmitted beam, and a terminal (38) restoring said information, wherein said system also comprises means for remote control of the source (S) of the transmitter assembly (EE) from the receiver assembly (ER), said remote control means incorporating:
   D) in the receiver assembly (ER):
      a polarizing circuit (I1, I2) adapted to tune the wavelength of the reception filter laser to that of the transmitter, a channel selection circuit (40) connected to the first electrode (E1) of the second laser (20) and adapted to supply the latter with current above a threshold in order to make it operate as an amplitude shift keying transmitter, said circuit (40) supplying an amplitude-encoded current (Ica) and the second laser (20) thus transmitting an amplitude shift keyed optical beam (29), which is transmitted to the transmitter assembly (EE) across the optical transmission line (FO),
   E) in the transmitter assembly (EE):
      a photoreceiver (48) sensitive to amplitude shift keying and receiving the amplitude shift keyed optical beam (29) from the second laser (20), said photoreceiver (48) supplying a voltage (Vca) restoring the code used for the amplitude shift keying of the second laser (20),
      a selection circuit (50) controlled by the detection voltage (Vca) and controlling the source (S), which comprises several information channels (C1, C2, etc.), the selection circuit (50) selecting one of these channels as a function of the code received.

2. System according to claim 1, wherein the transmitter assembly (EE) also comprises an optical coupler (44) to receive the amplitude shift keyed optical beam (29) supplied by the optical link (FO) and direct said beam to the photoreceiver (48).

3. System according to claim 2, wherein the transmitter assembly (EE) also comprises an optical isolator (46) positioned between the first laser (10) and the optical coupler (44).

4. System according to claim 1, wherein the channel selection circuit (40) of the receiver assembly (ER) is remotely controlled (42).

5. System according to any one of the claims 1 to 4, wherein that the amplitude shift keyed photoreceiver (48) is a PIN diode or APD.

6. System according to any one of the claims 1 to 4, wherein said system comprises a plurality of transmitter assemblies (EE1,EE2,EE3) operating in parallel and each at a particular wavelength ($\lambda 1$, $\lambda 2$, $\lambda 3$), each assembly being allocated to a particular service, the light beams ($19_1,19_2,19_3$) transmitted by the different lasers at different wavelengths being directed through the coupler (44) in the same optical transmission line (FO), the receiver assembly (ER) also incorporating a wavelength selection circuit (30) connected to the first (E1) and second (E2) electrodes of the second laser (20) in order to adjust the reception wavelength to one of the transmission wavelengths ($\lambda 1$, $\lambda 2$, $\lambda 3$) and a service selection circuit (31) for controlling the wavelength selector (30).

7. System according to claim 6, wherein the different transmitter assemblies (EE1,EE2,EE3) are respectively allocated to different services, each service having several channels.

8. System according to any one of the claims 1 to 4, comprising several receiver assemblies operating in parallel.

9. System according to claim 8, comprising means for transmitting from the transmitter assembly (EE) to the receiver assemblies (ER) an information allowing or preventing the receiver assemblies from remotely controlling a channel change.

10. System according to claim 9, wherein each channel selection circuit (40) of a receiver assembly (ER) comprises a memory for receiving and recording a channel change instruction, reading of said instruction being delayed if a remote control inhibiting signal has been received by the receiver assembly.

11. System according to claim 5, wherein said system comprises a plurality of transmitter assemblies (EE1, EE2, EE3) operating in parallel and each at a particular wavelength ($\lambda 1, \lambda 2, \lambda 3$), each assembly being allocated to a particular service, the light beams ($19_1, 19_2, 19_3$) transmitted by the different lasers at different wavelengths being directed through the coupler (44) in the same optical transmission line (FO), the receiver assembly (ER) also incorporating a wavelength selection circuit (30) connected to the first (E1) and second (E2) electrodes of the second laser (20) in Order to adjust the reception wavelength to one of the transmission wavelengths ($\lambda 1, \lambda 2, \lambda 3$) and a service selection circuit (31) for controlling the wavelength selector (30).

12. System according to claim 11, wherein the different transmitter assemblies (EE1, EE2, EE3) are respectively allocated to different services, each service having several channels.

13. System according to claim 5, comprising several receiver assemblies operating in parallel.

14. System according to claim 6, comprising several receiver assemblies operating in parallel.

15. System according to claim 7, comprising several receiver assemblies operating in parallel.

16. System according to claim 13, comprising means for transmitting from the transmitter assembly (EE) to the receiver assemblies (ER) an information allowing or preventing the receiver assemblies from remotely controlling a channel change.

17. System according to claim 14, comprising means for transmitting from the transmitter assembly (EE) to the receiver assemblies (ER) an information allowing or preventing the receiver assemblies from remotely controlling a channel change.

18. System according to claim 15, comprising means for transmitting from the transmitter assembly (EE) to the receiver assemblies (ER) an information allowing or preventing the receiver assemblies from remotely controlling a channel change.

19. System according to claim 16, wherein each channel selection circuit (40) of a receiver assembly (ER) comprises a memory for receiving and recording a channel change instruction, reading of said instruction being delayed if a remote control inhibiting signal has been received by the receiver assembly.

20. System according to claim 17, wherein each channel selection circuit (40) of a receiver assembly (ER) comprises a memory for receiving and recording a channel change instruction, reading of said instruction being delayed if a remote control inhibiting signal has been received by the receiver assembly.

* * * * *

UNITED STATES PATENT AND TRADEMARK OFFICE
CERTIFICATE OF CORRECTION

PATENT NO. : 5,343,315

DATED : August 30, 1994

INVENTOR(S) : Auffret et al.

It is certified that error appears in the above-identified patent and that said Letters Patent is hereby corrected as shown below:

```
Column 1, line 68, delete "35,36" and insert --35, 36--.

Column 2, line 37, delete "12" and insert --I2--.

Column 2, line 44, delete "c)" and insert --C)--.

Column 4, line 62, delete "such as" and insert --e.g.--.

Column 4, line 64, delete "e.g." and insert --such as--.

Column 6, line 36, (Claim 5, line 2), delete "that".

Column 7, line 14, (Claim 11, line 11), delete "Order" and
     insert --order--.
```

Signed and Sealed this

Twenty-fourth Day of January, 1995

Attest:

BRUCE LEHMAN

*Attesting Officer*  *Commissioner of Patents and Trademarks*